United States Patent [19]

Hattori et al.

[11] Patent Number: 4,476,709

[45] Date of Patent: Oct. 16, 1984

[54] KNOCK DETECTING APPARATUS FOR INTERNAL COMBUSION ENGINES

[75] Inventors: Tadashi Hattori, Okazaki; Tadashi Ozaki, Gamagori; Kazuhiko Miura; Yoshinori Ootsuka, both of Okazaki, all of Japan

[73] Assignee: Nippon Soken, Inc., Nishio, Japan

[21] Appl. No.: 408,896

[22] Filed: Aug. 17, 1982

[30] Foreign Application Priority Data

Aug. 18, 1981 [JP] Japan .................................. 56-129160

[51] Int. Cl.³ .............................................. G01L 23/22
[52] U.S. Cl. ..................................................... 73/35
[58] Field of Search ...................... 73/35; 123/425, 435

[56] References Cited

U.S. PATENT DOCUMENTS

| | | | |
|---|---|---|---|
| 4,111,035 | 9/1978 | West et al. ............................... | 73/35 |
| 4,153,020 | 5/1979 | King et al. ............................... | 73/35 |
| 4,312,214 | 1/1982 | Kramer et al. ........................... | 73/35 |
| 4,333,334 | 6/1982 | Nakajima et al. ........................ | 73/35 |

FOREIGN PATENT DOCUMENTS

55-69026  5/1980  Japan .................................. 123/425

*Primary Examiner*—Howard A. Birmiel
*Assistant Examiner*—John E. Chapman, Jr.
*Attorney, Agent, or Firm*—Cushman, Darby & Cushman

[57] ABSTRACT

In a knock detecting apparatus for an internal combustion engine, the output signal of a knock sensor whose output signal level varies in accordance with the engine conditions, engine speed, sensor sensitivity, etc., is passed through an automatic gain control circuit (AGC) thereby stabilizing the output level. The background noise level derived by integrating the output signal and the stabilized output signal are compared to detect the occurrence of knocking. The stabilized output signal is passed through a low-pass filter or a band-pass filter and the resulting control signal is used to control the gain of the AGC circuit.

4 Claims, 6 Drawing Figures

KNOCK DETECTING APPARATUS FOR INTERNAL COMBUSION ENGINES

BACKGROUND OF THE INVENTION

1. Field of the Invention

The present invention relates to a knock detecting apparatus which is used with an ignition timing control system for an internal combustion engine and has the functions of detecting the occurrence of knocking from a knock signal generated internally or externally of any cylinder of the engine due to the cylinder combustion pressure and adjusting the ignition timing of the engine so as to reduce the knocking to a given knock level.

For use with a conventional internal combustion engine, ignition timing control systems have been proposed in which upon noting that the ignition timing has a close relation to the occurrence of knocking, while detecting the knock condition of the engine, the ignition timing is advanced or retarded in accordance with the knock condition and the engine is operated at a weak or so-called trace knock condition, thereby increasing the power output and improving the fuel economy.

2. Description of the Prior Art

FIG. 1 of the accompanying drawings shows an example of the known knocking detecting apparatus for detecting the occurrence of knocking, which is used in the above type of ignition timing control system.

More specifically, numeral 1 designates a knock sensor of any type capable of detecting a knock induced high frequency signal, e.g., a sensor which detects the occurrence of knocking from the engine block vibrations, the knocking sounds or the cooling water pressure variations.

Numeral 10 designates a knock detecting apparatus whose output is used to advance or retard the ignition timing.

The output of the knock sensor 1 is amplified to a given voltage level by an amplifier circuit 2.

Generally with respect to cylinder internal pressure, high frequency components appear only in the vicinity of the peak value of the internal pressure of the cylinder during the knocking period. Irrespective of whether the knock sensor is of the resonant or nonresonant type, vibration noise (e.g., valve seating noise, ignition noise or the like) also appears at other values than around the peak value of the cylinder pressure. Also, this vibration noise increases with an increase in the engine speed and the S/N ratio deteriorates. Particularly, the effect of the noise is large during the high speed and load operations of the engine. As a result, the usual practice of detecting the presence of knocking has been such that the output of the amplifier circuit 2 is integrated by an integrator circuit 3 to provide a background noise level and this level is compared with the direct output from the amplifier circuit 2 in a comparator circuit 4 thereby determining the presence of knocking. Numeral 5 designates a discriminating circuit whereby a logic level "1" is generated in the presence of knock and a logic level "0" is generated in the absence of knock.

However, generally the signal level of the output from the knock sensor 1 tends to vary in dependence on the engine conditions, particularly the engine speed, the sensor sensitivity, the engine characteristics, etc., and this tendency is not desirable because of it being a primary cause in deteriorating the knock detecting performance.

Thus, another method has been previously proposed in which the amplifier 2 is replaced by an automatic gain control circuit or AGC circuit 6 as shown in FIG. 2. In other words, it is constructed so that the output of the knock sensor 1 is passed through the AGC circuit 6 and its output average value is maintained substantially constant, thereby making the knock detecting sensitivity stable and highly sensitive.

FIG. 3 shows one example of the known type of AGC circuit 6.

In this circuit, when the output from an operational amplifier 6a exceeds, during the negative cycle, the voltage of a Zener diode $D_Z$, a diode D is turned on and a voltage drop occurs across a resistor R, thereby applying a bias voltage to the gate G of a field effect transistor or FET 6b. In the low voltage range, the FET 6b operates as a variable resistance device and its resistance value is controlled by the gate voltage. Thus, as the bias voltage is applied to the gate G of the FET 6b, a negative feedback is applied to the output amplitude of the operational amplifier 6a so that the gain is reduced and the output of the operational amplifier 6a tends to assume a constant value. In this way, the AGC circuit shown in FIG. 3 is used.

While the knock detecting apparatus shown in FIG. 2 can compensate for changes in the engine conditions and the sensor sensitivity, it still cannot overcome the following disadvantages.

(1) Since the bias voltage applied to the gate G of the FET 6b is dependent on the voltage itself of the operational amplifier 6a, despite the primary intention of controlling the gain of the operational amplifier 6a so as to maintain the background noise level substantially constant, the gain control is also effected in response to a noise voltage of impulsive noise, e.g., ignition noise or valve seating noise which should not be included in the background noise.

(2) Since the above-mentioned bias voltage has no frequency selectivity, the occurrence of knock allows the knock signal itself to affect the gain control. As a result, the continuation of a high knock level has the effect of reducing the background noise unnecessarily.

As described hereinabove, despite the primary intention of maintaining the background noise substantially constant under all the conditions, the abovementioned types of knock detecting apparatus are disadvantageous in that the background noise is varied depending on the presence of knocking and impulsive noise of various kinds.

SUMMARY OF THE INVENTION

With a view to overcoming the foregoing deficiencies in the prior art, it is the primary object of the invention to provide an improved knock detecting apparatus in which a negative feedback loop of an AGC circuit is provided with frequency selectivity and the AGC circuit effects the gain control so as to maintain the background noise substantially constant under all the conditions and thereby always maintain the knock detecting performance excellent.

DESCRIPTION OF THE PREFERRED EMBODIMENTS

The present invention will now be described in greater detail with reference to the illustrated embodiments.

Figure 3:
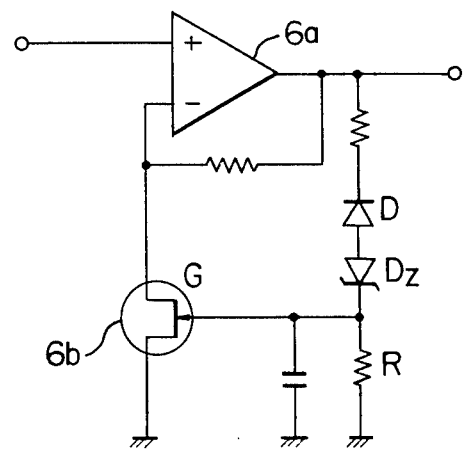
FIG. 3 shows an example of a prior art AGC circuit.
Figure 4:
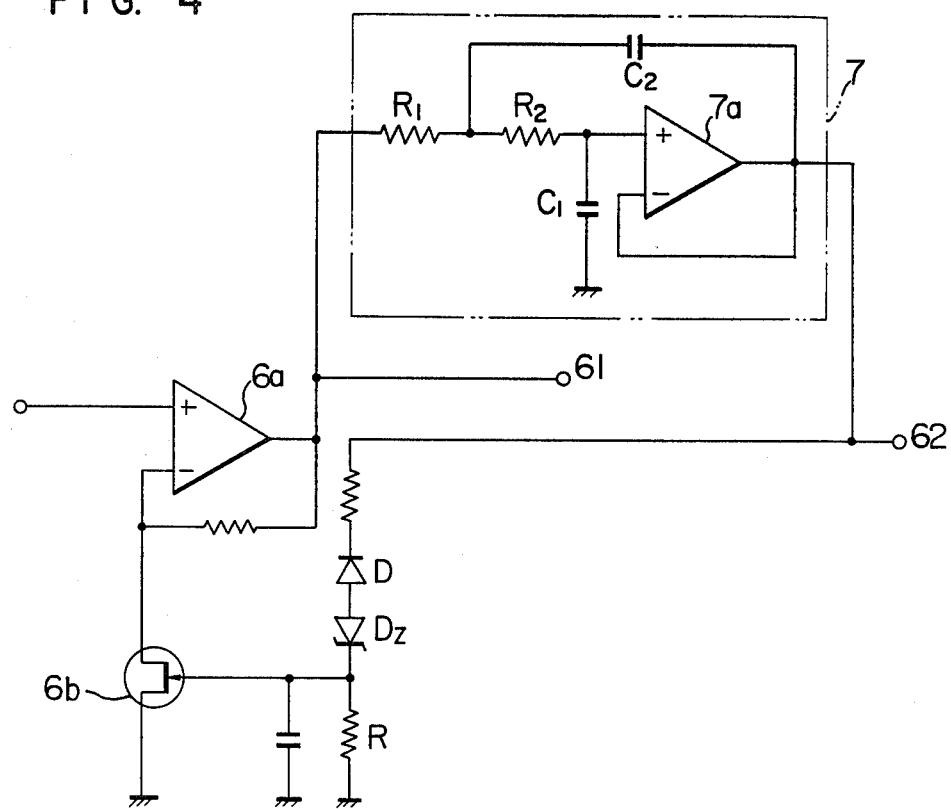
FIG. 4 shows a first embodiment of an AGC circuit used in a knock detecting apparatus according to the invention.

FIG. 4 shows a first embodiment of an AGC circuit including a low-pass filter as a means of providing the desired frequency selectivity according to the invention. In the Figure, the same reference numerals as used in FIG. 3 designates the same component parts.

The circuit of FIG. 4 differs from the circuit of FIG. 3 in that the output of the operational amplifier 6a is connected to the Zener diode $D_Z$ through a low-pass filter 7.

The operation of the circuit will now be described.

An output from the operational amplifier 6a always includes various frequency components irrespective of the occurrence of knocking. Thus, according to the present embodiment, the low-pass filter 7 is connected to the operational amplifier 6a to pass frequency components lower than the knock frequencies, e.g., those frequency components lower than 6 KHz as the background noise components. In this embodiment the low-pass filter 7 is of the Butterworth type using an operational amplifier 7a, one of the active filters, and its cut-off frequency is determined by the values of resistors $R_1$ and $R_2$ and capacitors $C_1$ and $C_2$.

The low-pass filter 7 selects only the background noise components and applies the same to the Zener diode $D_Z$ thus providing a gain control signal to the operational amplifier 6a.

Consequently, an output 61 of the operational amplifier 6a comprises the knock signal superposed on the gain which maintains the background noise substantially constant, and a filter output 62 comprises only the background noise signal which is maintained substantially constant.

Figure 1:
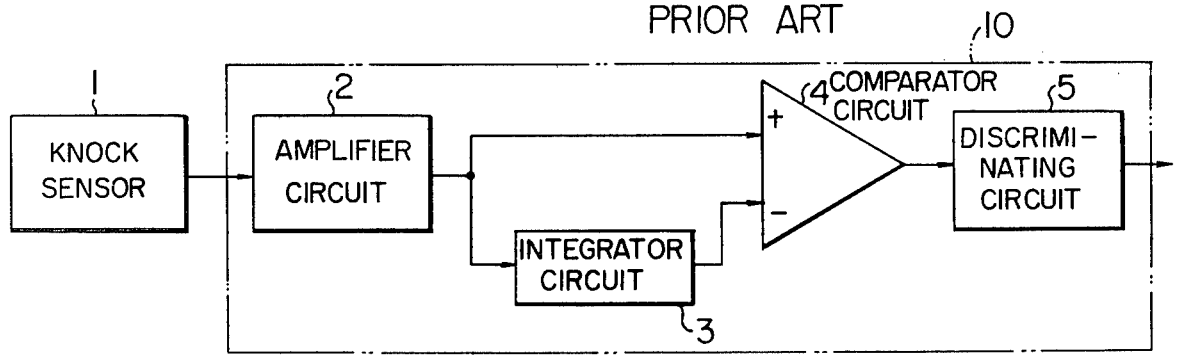
FIG. 1 is a block diagram of a prior art knock detecting apparatus.
Figure 2:
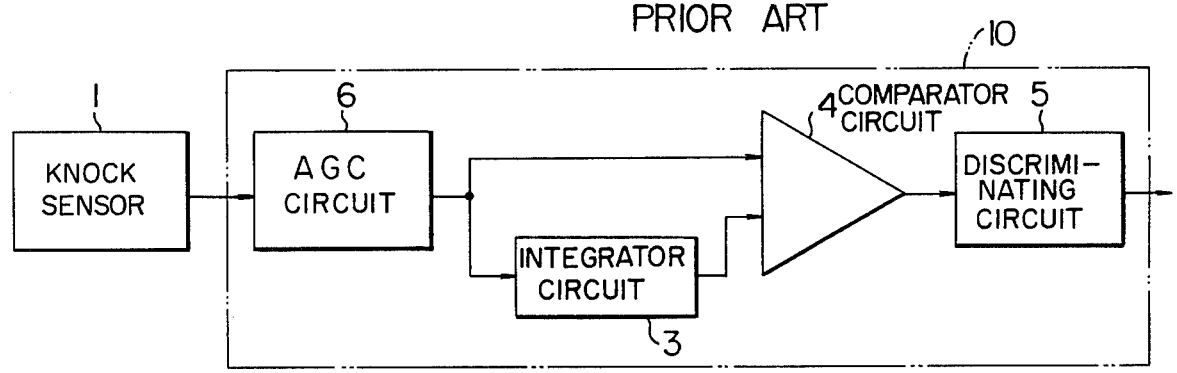
FIG. 2 is a block diagram of another prior art knock detecting apparatus including an AGC circuit.

The output 61 of the operational amplifier 6a is directly coupled to one input of the following comparator circuit 4 as shown in FIG. 2. The output 62 of the low-pass filter 7 is integrated by the integrator circuit 3 and then coupled to the other input of the comparator circuit 4.

Figure 5:
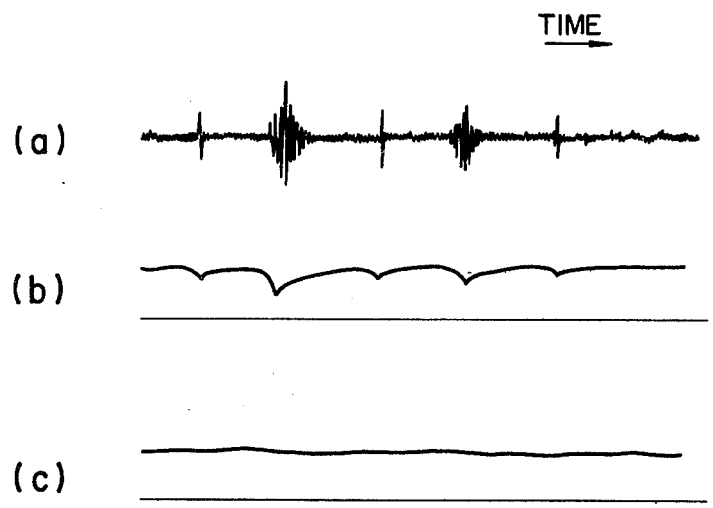
FIG. 5 shows a plurality of waveforms for explaining the integrated values of background noise obtained by using the prior art AGC circuit and the AGC circuit according to the invention, respectively.

FIG. 5 shows a comparison between the integrated values of the background noise obtained by use of the prior art AGC circuit and the AGC circuit according to the invention, respectively. More specifically, the knock sensor output (a) comprises knock and nonknock signals as well as valve seating noise and ignition noise. Then, the integration of the background noise by use of the prior art AGC circuit results in what is shown in (b), that is, if, for example, the knock intensity is high, the resulting knock signal controls the gain of the AGC circuit and the gain is reduced. Consequently, when the knock intensity is high, the background noise is integrated to be smaller. On the contrary, the integration of the background noise by use of the AGC circuit according to the invention results in what is shown in (c), that is, even in the presence of knock or in the presence of ignition noise or valve noise, the gain control is effected without the knock or noise frequency components and thus the background noise is always maintained constant irrespective of the presence or absence of knock and other noise.

While, in the above-described embodiment, the gain control of the AGC circuit is effected by using the output of the low-pass filter, the accuracy of the background noise can be increased further by the use of a band-pass filter (hereinafter referred to as a BPF).

For instance, by using a BPF of 4 to 6 KHz, it is possible to remove ignition noise having a center frequency of 3 KHz and thereby improve the accuracy of the background noise. On the other hand, where the detection of knock is effected in accordance with cooling water pressure variations, large waves of less than 1 KHz take place and the use of a BPF of 2 to 6 KHz can improve the accuracy of the background noise.

Figure 6:
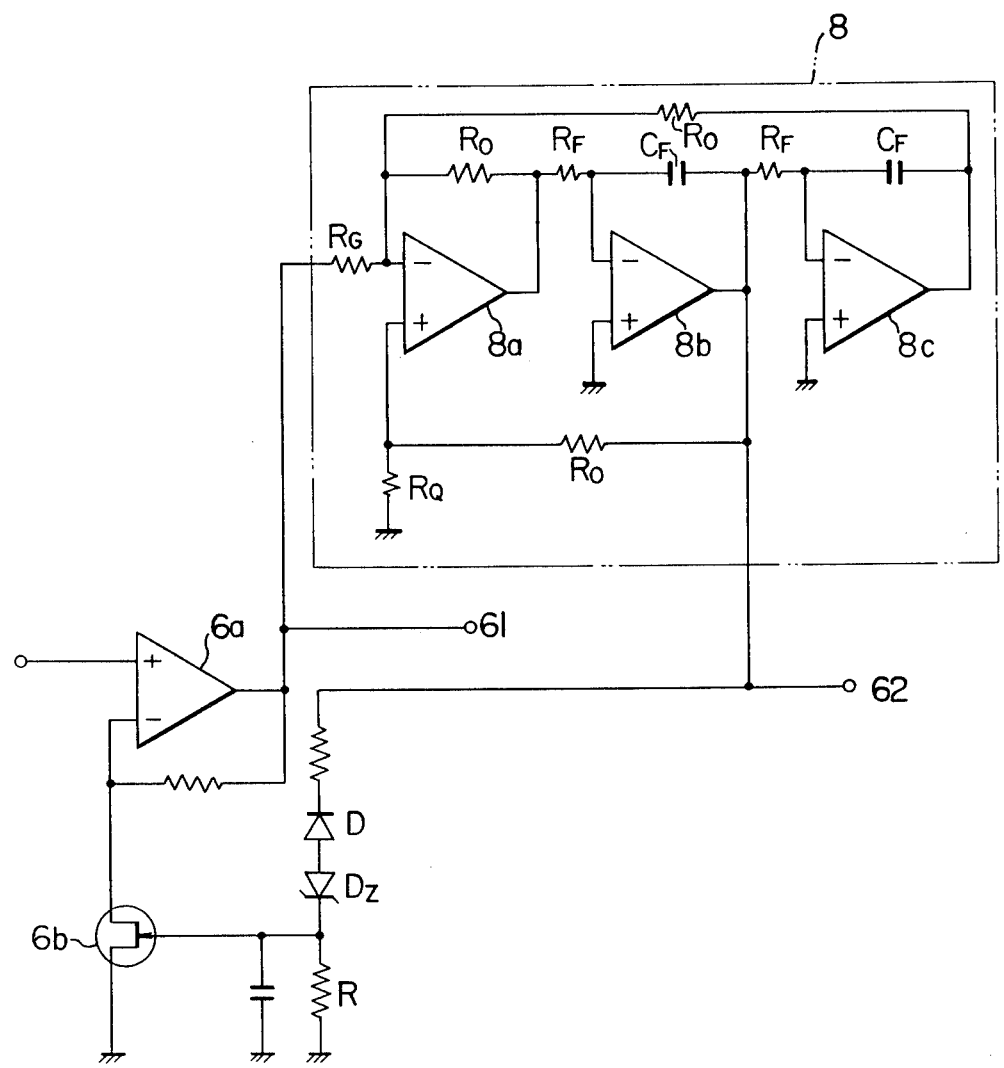
FIG. 6 shows a second embodiment of the AGC circuit used in the apparatus according to the invention.

FIG. 6 shows a second embodiment of the AGC circuit used in the apparatus of the invention.

In the Figure, numeral 8 designates an active filter using operational amplifiers as the filter shown in FIG. 4 and forming a band-pass filter of a so-called state variable type comprising three operational amplifiers 8a, 8b and 8c, a resistor $R_F$ and a capacitor $C_F$ for determining a center frequency and resistors $R_D$, $R_G$ and $R_Q$ for determining a band width.

In operation, the background noise components are passed by the BPF 8 with greater accuracy and applied to the Zener diode $D_Z$ thereby supplying a gain control signal to the operational amplifier 6a.

From the foregoing description it will be seen that in accordance with the knock detecting apparatus of this invention, by virtue of the fact that the AGC circuit is connected to the knock sensor and the gain control of the AGC circuit is provided with frequency selectivity, there is a great advantage that irrespective of changes in the engine conditions and the sensor sensitivity and irrespective of the presence or absence of knocking, the background noise level is maintained substantially constant and the knock detecting performance can be improved greatly.

We claim:

1. A knock detecting apparatus for internal combustion engines comprising:
   knock detecting means for detecting the occurence of knocking in an engine;
   automatic gain control means for processing an output signal of said knock detecting means to form a background noise signal having a substantially constant level and a knock signal;
   comparator means responsive to said background noise signal and said knock signal to determine the presence of knocking in said engine;
   said automatic gain control means having a negative feedback loop including frequency selecting means for providing the gain control of said automatic gain control means with frequency selectivity,
   wherein said automatic gain control means includes voltage controlled means for effecting said gain control, and wherein said frequency selecting means comprises a low-pass filter for connecting an output of said control means to said voltage controlled means, said filter having a cutoff frequency lower than knock frequencies.

2. An apparatus according to claim 1, wherein said gain control is effected by frequency components other than knock frequencies.

3. A knock detecting apparatus for internal combustion engines comprising:
   knock detecting means for detecting the occurrence of knocking in an engine;
   automatic gain control means for processing an output signal of said knock detecting means to form a background noise signal having a substantially constant level and a knock signal;
   comparator means responsive to said background noise signal and said knock signal to determine the presence of knocking in said engine;
   said automatic gain control means having a negative feedback loop including frequency selecting means for providing the gain control of said automatic gain control means with frequency selectivity,
   wherein said automatic gain control means includes voltage controlled means for effecting said gain control, and wherein said frequency selecting means comprises a band-pass filter for connecting an output of said control means to said voltage controlled means, said filter having a passband excluding frequency bands of knock frequencies, ignition frequencies and valve seating noise frequencies.

4. An apparatus according to claim 3, wherein said gain control is effected by frequency components other than knock frequencies.

* * * * *